United States Patent
Maben et al.

(10) Patent No.: US 10,823,449 B2
(45) Date of Patent: Nov. 3, 2020

(54) COMPOSITE DUCT WITH REINFORCEMENT

(71) Applicant: The Boeing Company, Chicago, IL (US)

(72) Inventors: Douglas Dean Maben, Snohomish, WA (US); Johnathan Perdoch, Everett, WA (US); Jennifer Fiore Cox, Lake Stevens, WA (US); Altagracia Saldana, Everett, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 16/003,823

(22) Filed: Jun. 8, 2018

(65) Prior Publication Data

US 2019/0376717 A1 Dec. 12, 2019

(51) Int. Cl.
| | | |
|---|---|---|
| *F24F 13/02* | (2006.01) |
| *B29C 70/70* | (2006.01) |
| *B29C 65/00* | (2006.01) |
| *B32B 1/08* | (2006.01) |
| *B32B 3/12* | (2006.01) |
| *B29L 23/00* | (2006.01) |

(52) U.S. Cl.
CPC .......... *F24F 13/0263* (2013.01); *B29C 66/53* (2013.01); *B29C 70/70* (2013.01); *B32B 1/08* (2013.01); *B32B 3/12* (2013.01); *F24F 13/0245* (2013.01); *F24F 13/0281* (2013.01); *B29L 2023/22* (2013.01); *B32B 2597/00* (2013.01)

(58) Field of Classification Search
CPC ...................................................... B29C 66/53
See application file for complete search history.

(56) References Cited

U.S. PATENT DOCUMENTS

| | | | | |
|---|---|---|---|---|
| 2004/0026825 A1* | 2/2004 | Bergsma | ............... | B29C 53/043 264/285 |
| 2019/0078705 A1* | 3/2019 | Bauchmoyer | ....... | B29C 66/1122 |
| 2019/0360620 A1* | 11/2019 | McDonald | .......... | F16L 25/0054 |

* cited by examiner

*Primary Examiner* — Barbara J Musser
(74) *Attorney, Agent, or Firm* — Yee & Associates, P.C.

(57) ABSTRACT

A composite duct with reinforcement comprises an inner ply, an outer ply, and a plurality of cellular core rings. The inner ply forms a channel with a circular cross-section. The plurality of cellular core rings is positioned at set intervals along a length of the composite duct and between the inner ply and the outer ply.

20 Claims, 6 Drawing Sheets

COMPOSITE DUCT WITH REINFORCEMENT

BACKGROUND INFORMATION

1. Field

The present disclosure relates generally to ducts and, more specifically, to composite ducts. Yet more specifically, the present disclosure provides reinforcement for a composite duct, the reinforcement comprising cellular core rings.

2. Background

An Environmental Control System (ECS) provides control of air quality and pressure within the cabin of an aircraft. The Environmental Control System (ECS) includes ducts to supply air to the cabin as well as other functions. Environmental Control System (ECS) ducts extend through pressurized and unpressurized portions of an aircraft. In some operating conditions, some Environment Control System (ECS) ducts encounter negative pressure.

Environmental Control System (ECS) ducts are made of any desirable material. Decreasing the weight of an aircraft is desirable to reduce the operating costs of the aircraft. Composite materials are used in aircraft to decrease the weight of the aircraft. Some Environmental Control System (ECS) ducts are formed of composite materials. Under negative pressure composite ducts may experience buckling or other undesirable physical changes.

Therefore, it would be desirable to have a method and apparatus that takes into account at least some of the issues discussed above, as well as other possible issues. For example, it would be desirable to reduce undesirable physical changes to composite ducts within an aircraft due to negative pressure.

SUMMARY

An illustrative embodiment of the present disclosure provides a method of forming a composite duct with reinforcement. A first ply is formed into a tube with a circular cross-section. A partial ply and a cellular core ring are positioned over a portion of the first ply. A second ply is laid up over the partial ply and the cellular core ring to form the composite duct with reinforcement.

Another illustrative embodiment of the present disclosure provides a method of forming a composite duct with reinforcement. A first ply is formed into a tube with a circular cross-section. A plurality of cellular core rings is positioned around the circular cross-section, the plurality of cellular core rings separated by set intervals. A second ply is positioned over the plurality of cellular core rings. The first ply and the second ply are cured to form the composite duct with reinforcement.

Yet another illustrative embodiment of the present disclosure provides a composite duct with reinforcement. The composite duct with reinforcement comprises an inner ply, an outer ply, and a plurality of cellular core rings. The inner ply forms a channel with a circular cross-section. The plurality of cellular core rings is positioned at set intervals along a length of the composite duct and between the inner ply and the outer ply.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that composite materials are tough, light-weight materials created by combining two or more functional components. For example, the illustrative embodiments recognize and take into account that a composite material may include reinforcing fibers bound in polymer resin matrix. The fibers may be unidirectional or may take the form of a woven cloth or fabric. The fibers and resins are arranged and cured or consolidated to form a composite material.

The illustrative embodiments recognize and take into account that in manufacturing composite structures, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

The illustrative embodiments recognize and take into account that the different layers of prepreg may be laid up in different orientations and different numbers of layers may be used depending on the thickness of the composite structure being manufactured. These layers may be laid up by hand or using automated lamination equipment such as a tape laminating machine or a fiber placement system.

The illustrative embodiments recognize and take into account that composite ducts may be manufactured using sheets of pre-impregnated composite material. The illustrative embodiments recognize and take into account that one conventional solution to increase the strength of a composite duct is to add extra plies to the layup of the composite duct. The illustrative embodiments recognize and take into account that adding extra plies increases the weight and cost of the composite duct. The illustrative embodiments recognize and take into account that additional plies may only marginally increase strength.

The illustrative embodiments recognize and take into account that one conventional solution to increase the strength of a composite duct is to provide localized stiffening made from extra plies of composite material to provide additional strength. The illustrative embodiments recognize and take into account that localized stiffening made from extra plies of composite material provide a minimal height increase as the plies are approximately 0.008 to 0.01 thick. The illustrative embodiments recognize and take into account that localized stiffening made from extra plies may not provide a desired amount of additional strength.

The illustrative examples recognize and take into account that negative pressure composite ducts may have at least one of a bend or a curve. The illustrative examples recognize and take into account that bends or curves in the negative pressure composite duct may create additional considerations in designing reinforcement for a negative pressure composite duct.

Figure 1:
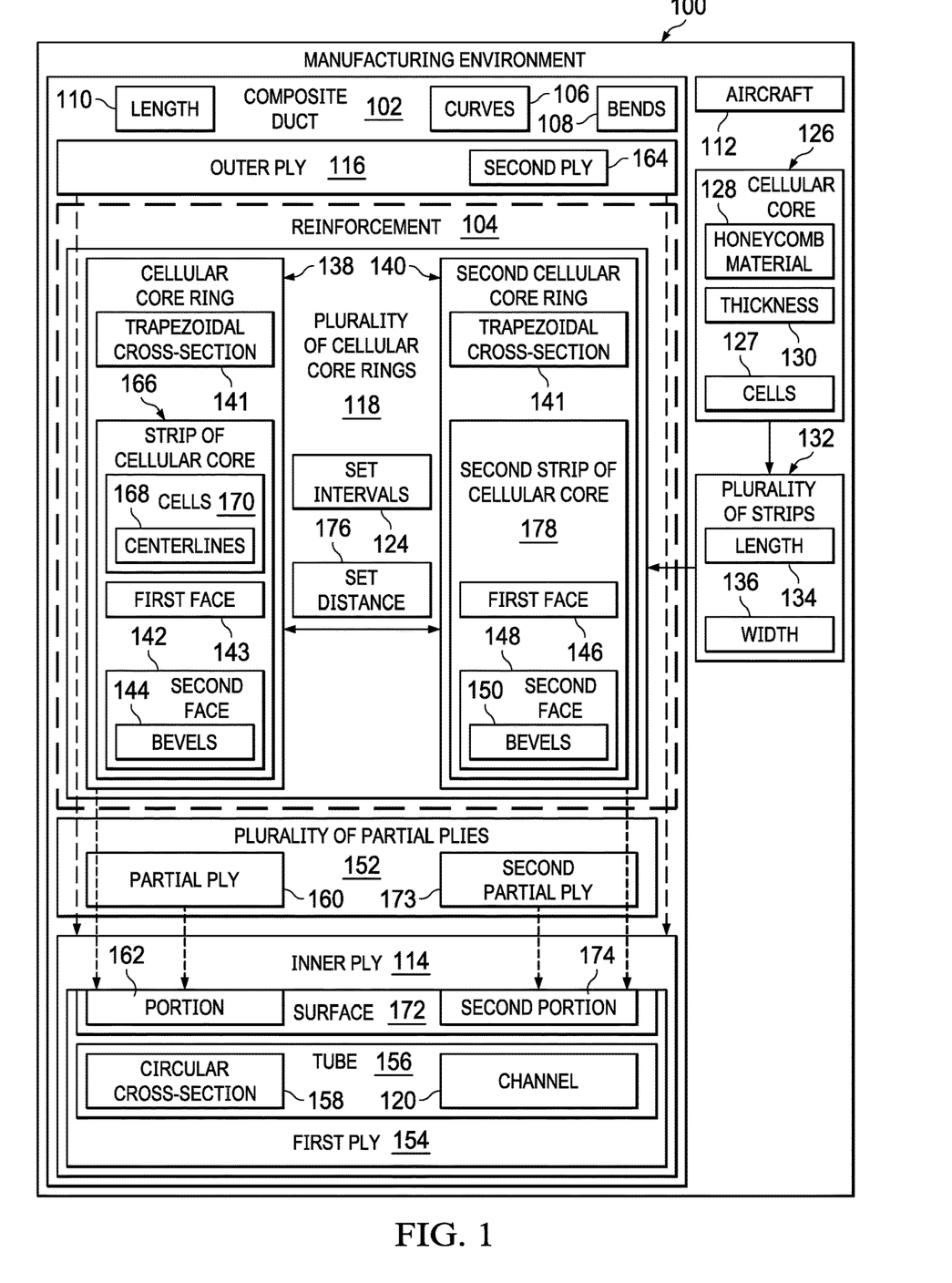
FIG. 1 is an illustration of a block diagram of a manufacturing environment in which a composite duct is formed in accordance with an illustrative embodiment.

Turning now to the figures, and, in particular, to FIG. 1, an illustration of a block diagram of a manufacturing environment in which a composite duct is formed is depicted in accordance with an illustrative example. Manufacturing environment 100 is an environment in which composite duct 102 with reinforcement 104 is manufactured.

Composite duct 102 has any desirable dimensions and features. In some illustrative examples, composite duct 102 has at least one of curves 106 or bends 108. Composite duct 102 has length 110 with any desirable value.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, composite duct 102 is a component of aircraft 112. In some illustrative examples, composite duct 102 is a component of an environmental control system of aircraft 112. In some illustrative examples, composite duct 102 is a negative pressure composite duct.

Composite duct 102 with reinforcement 104 comprises inner ply 114, outer ply 116, and plurality of cellular core rings 118. Inner ply 114 forms channel 120 with circular cross-section 122. Channel 120 may also be referred to as a pathway or a conduit of composite duct 102.

Plurality of cellular core rings 118 is positioned at set intervals 124 along length 110 of composite duct 102 and between inner ply 114 and outer ply 116. Plurality of cellular core rings 118 form reinforcement 104 for composite duct 102.

In some illustrative examples, set intervals 124 are in the range of 10 inches to 25 inches. Set intervals 124 are selected based on dimensions of composite duct 102 and desired operating conditions for composite duct 102. For example, set intervals 124 are selected based on at least one of diameter of composite duct 102 and an operating pressure for composite duct 102.

Each of plurality of cellular core rings 118 is formed from cellular core 126. Cellular core 126 has a plurality of hollow cells of any desirable size or shape. For example, cells 127 of cellular core 126 may be at least one of square, hexagonal, triangular, or any other desirable shape.

In some illustrative examples, cellular core 126 takes the form of honeycomb material 128. In some illustrative examples, plurality of cellular core rings 118 each is formed of honeycomb material 128 having thickness 130 in the range of ¹⁄₁₆ inch to ½ inch.

To form plurality of cellular core rings 118, plurality of strips 132 may be cut from cellular core rings 118. Plurality of strips 132 are cut to any desirable size. Length 134 of each of plurality of strips 132 is cut to a quantity sufficient to wrap around inner ply 114. Width 136 of each of plurality of strips 132 is cut to any desired width. In some illustrative examples, width 136 is in the range of 1 inch to 3 inches. In some illustrative examples, width 136 is selected to accommodate bevels.

In some illustrative examples, plurality of cellular core rings 118 each is formed of honeycomb material 128 having width in the range of 1 inch to 3 inches. In some illustrative example, plurality of cellular core rings 118 each is formed of honeycomb material 128 having width of 2 inches. As depicted, each of plurality of cellular core rings 118 has a trapezoidal cross-section. For example, cellular core ring 138 and second cellular core ring 140 each has trapezoidal cross-section 141.

In some illustrative examples, each of plurality of cellular core rings 118 has a second face with bevels, wherein each of the bevels has a length of ¼ inch to 1 inch. In some illustrative examples, each of plurality of cellular core rings 118 has a second face with bevels, wherein each of the bevels has a length of about ½ inch. In some illustrative examples, each of the bevels has a length selected to provide a bevel angle in the range of 15 degrees to 45 degrees.

For example, cellular core ring 138 has first face 143 and second face 142. As depicted, second face 142 has bevels 144. As another example, second cellular core ring 140 has first face 146 and second face 148. As depicted, second face 148 has bevels 150. Bevels 144 and bevels 150 increase manufacturability of composite duct 102. For example, bevels 144 aid in applying a composite ply over cellular core ring 138 without gaps. As another example, bevels 150 aid in applying a composite ply over second cellular core ring 140 without gaps.

Beveling plurality of cellular core rings 118 facilitates layup. Beveling plurality of cellular core rings 118 also reduces or prevents stress risers at the edges of plurality of cellular core rings 118.

Beveling plurality of cellular core rings 118 aids in providing desirable values for width 136 of plurality of strips 132. Increasing width 136 increases support provided to composite duct 102. If width 136 is too great, plurality of cellular core rings 118 will not conform to surface 172 where there are curves 106 or bends 108.

As depicted, composite duct 102 further comprises plurality of partial plies 152 in contact with plurality of cellular core rings 118. Plurality of partial plies 152 is in contact with inner ply 114 and outer ply 116. Plurality of partial plies 152 prevents creating air pathways between inner ply 114 and outer ply 116.

In some illustrative examples, plurality of partial plies 152 is in contact with first faces of plurality of cellular core rings 118. In these illustrative examples, plurality of partial plies 152 are between plurality of cellular core rings 118 and inner ply 114.

In some other illustrative examples, plurality of partial plies 152 is in contact with second faces of plurality of cellular core rings 118. In these illustrative examples, plurality of partial plies 152 are between plurality of cellular core rings 118 and outer ply 116.

In some illustrative examples, to form composite duct 102 with reinforcement 104, first ply 154 is formed into tube 156 with circular cross-section 158. First ply 154 forms inner ply 114 of composite duct 102.

Partial ply 160 and cellular core ring 138 are positioned over portion 162 of first ply 154. Partial ply 160 and cellular core ring 138 increase the strength of composite duct 102. Second ply 164 is laid up over partial ply 160 and cellular core ring 138 to form composite duct 102 with reinforcement 104.

In some illustrative examples, positioning partial ply 160 and cellular core ring 138 over portion 162 of first ply 154 comprises wrapping strip of cellular core 166 around circular cross-section 158 and applying partial ply 160 over strip of cellular core 166. In these illustrative examples, strip of cellular core 166 is a strip of plurality of strips 132.

As depicted, strip of cellular core 166 has first face 143 and second face 142 opposite first face 143. Wrapping strip of cellular core 166 comprises wrapping strip of cellular core 166 such that first face 143 contacts first ply 154.

In some illustrative examples, positioning partial ply 160 and cellular core ring 138 over portion 162 of first ply 154 comprises wrapping partial ply 160 around circular cross-section 158 and applying strip of cellular core 166 over partial ply 160.

In some illustrative examples, strip of cellular core 166 has first face 143 and second face 142 opposite first face 143, wherein second face 142 has bevels 144, and wherein applying strip of cellular core 166 over partial ply 160 comprises applying strip of cellular core 166 such that first face 143 contacts partial ply 160.

Positioning partial ply 160 and cellular core ring 138 over portion 162 of first ply 154 comprises positioning cellular core ring 138 such that centerlines 168 of cells 170 of cellular core ring 138 are perpendicular to surface 172 of first ply 154. Centerlines 168 of cells 170 are radial relative to circular cross-section 158.

As depicted, plurality of cellular core rings 118 also includes second cellular core ring 140. Second partial ply 173 and second cellular core ring 140 are positioned over second portion 174 of first ply 154 prior to laying up second ply 164 over cellular core ring 138. Second cellular core ring 140 is set distance 176 away from the cellular core ring 138. Set distance 176 is the distance of set intervals 124.

Second cellular core ring 140 is formed by wrapping second strip of cellular core 178 around circular cross-section 158. Second strip of cellular core 178 is positioned such that bevels 150 face second ply 164.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although plurality of cellular core rings 118 is depicted as having cellular core ring 138 and second cellular core ring 140 contains any desirable quantity of cellular core rings. A desired quantity of cellular core rings is affected by length 110 of composite duct 102 and set intervals 124 of plurality of cellular core rings 118.

Figures 2, 3:
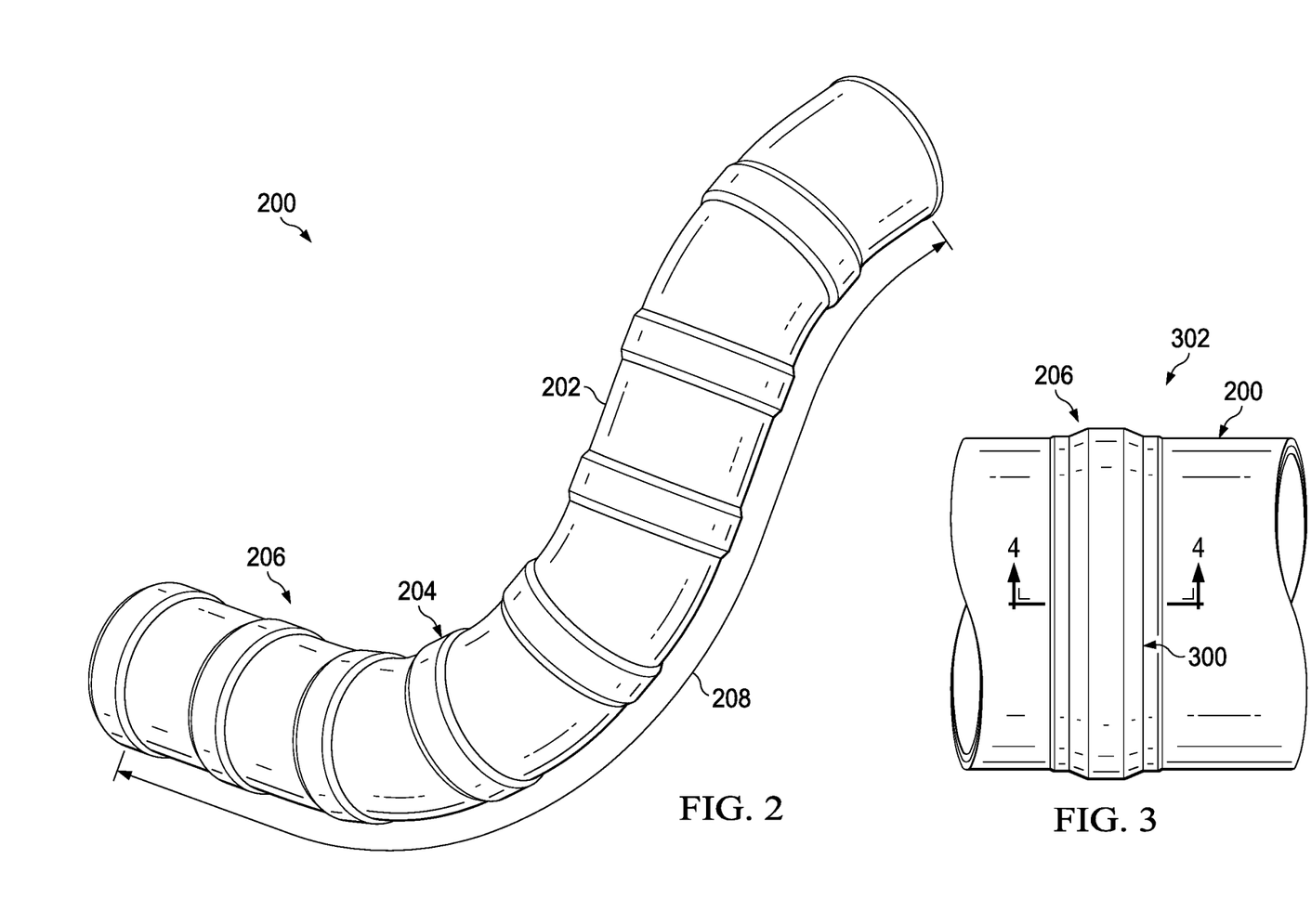
FIG. 2 is an illustration of a perspective view of a composite duct with reinforcement comprising cellular core rings in accordance with an illustrative embodiment.
FIG. 3 is an illustration of a side view of a reinforcement location comprising a cellular core ring in a composite duct in accordance with an illustrative embodiment.

Turning now to FIG. 2, an illustration of a perspective view of a composite duct with reinforcement comprising cellular core rings is depicted in accordance with an illustrative embodiment. Composite duct 200 is a physical implementation of composite duct 102 of FIG. 1.

Composite duct 200 has outer ply 202 covering reinforcement 204 provided by plurality of cellular core rings 206. Plurality of cellular core rings 206 are positioned at set intervals along length 208 of composite duct 200. The trapezoidal cross-section of each of plurality of cellular core rings 206 creates localized changes to the outer diameter of composite duct 200.

Turning now to FIG. 3, an illustration of a side view of a reinforcement location comprising a cellular core ring in a composite duct is depicted in accordance with an illustrative embodiment. Cellular core ring 300 of plurality of cellular core rings 206 is visible in view 302. As depicted, cellular core ring 300 causes a localized change to the outer diameter of composite duct 200.

Figure 4:
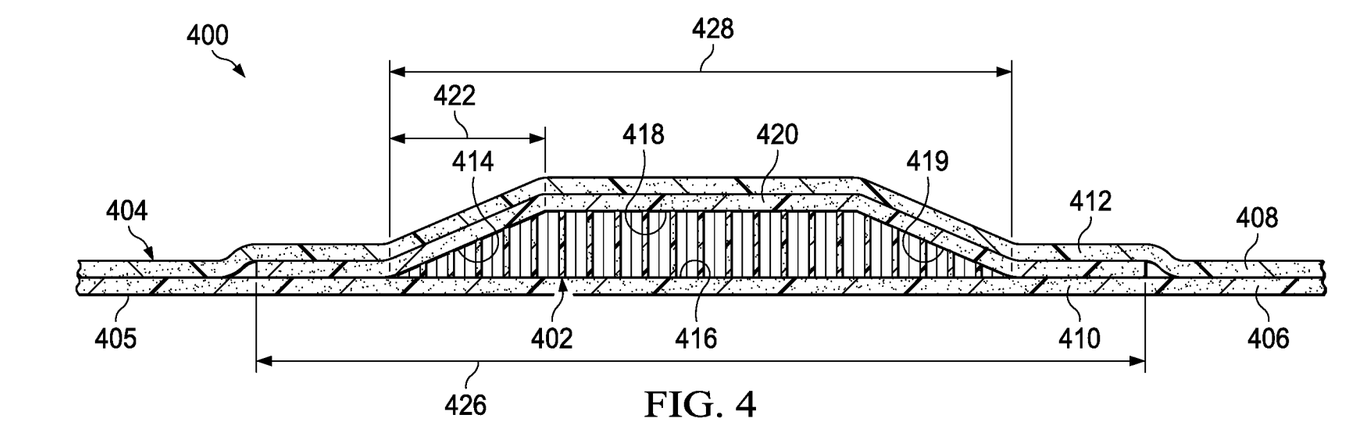
FIG. 4 is an illustration of a cross-sectional view of a cellular core ring in a composite duct in accordance with an illustrative embodiment.

Turning now to FIG. 4, an illustration of a cross-sectional view of a cellular core ring in a composite duct is depicted in accordance with an illustrative embodiment. View 400 is a cross-sectional view of cellular core ring 402 within composite duct 404. Cellular core ring 402 is a physical implementation of cellular core ring 138 of FIG. 1. In some illustrative examples, cellular core ring 402 is the same as cellular core ring 300 of FIG. 3.

As depicted, wall 405 of composite duct 404 is formed from first ply 406 and second ply 408. In some illustrative examples, first ply 406 is referred to as inner ply 410. In some illustrative examples, second ply 408 is referred to as outer ply 412.

Inner ply 410 contacts outer ply 412 to form airtight wall 405 of composite duct 404. Cellular core ring 402 provides reinforcement to composite duct 404. As depicted, cellular core ring 402 has trapezoidal cross-section 414.

Cellular core ring 402 has first face 416 and second face 418. First face 416 contacts inner ply 410. Second face 418 has bevels 419 and contacts partial ply 420. Partial ply 420 extends over cellular core ring 402 to contact both inner ply 410 and outer ply 412. Partial ply 420 prevents air pathways between inner ply 410 and outer ply 412 to prevent leaks.

Bevels 419 aid in manufacturing composite duct 404. Bevels 419 aid in laying partial ply 420 over cellular core ring 402 without undesirable amounts of gaps. As depicted, each of bevels 419 has length 422. Length 422 has any desirable quantity. In some illustrative examples, length 422 is in the range of ¼ inch to 1 inch. In some illustrative examples, length 422 is about ½ inch. In some illustrative examples, length 422 is selected to provide a bevel angle in the range of 15 degrees to 45 degrees.

Partial ply 420 is formed of any desirable impermeable material. In some illustrative examples, partial ply 420 is formed of a composite material. In some illustrative examples, partial ply 420 is formed of any desirable thermoplastic material. Distance 426 measured from end to end of partial ply 420 has any desirable value to maintain an airtight seal for composite duct 404. In some illustrative examples, distance 426 is at least half an inch on either side of cellular core ring 402.

As depicted, cellular core ring 402 has width 428. Width 428 has any desirable value in the range of 1 inch to 3 inches. In some illustrative examples, cellular core ring 402 has width 428 of approximately 2 inches.

Figure 5:
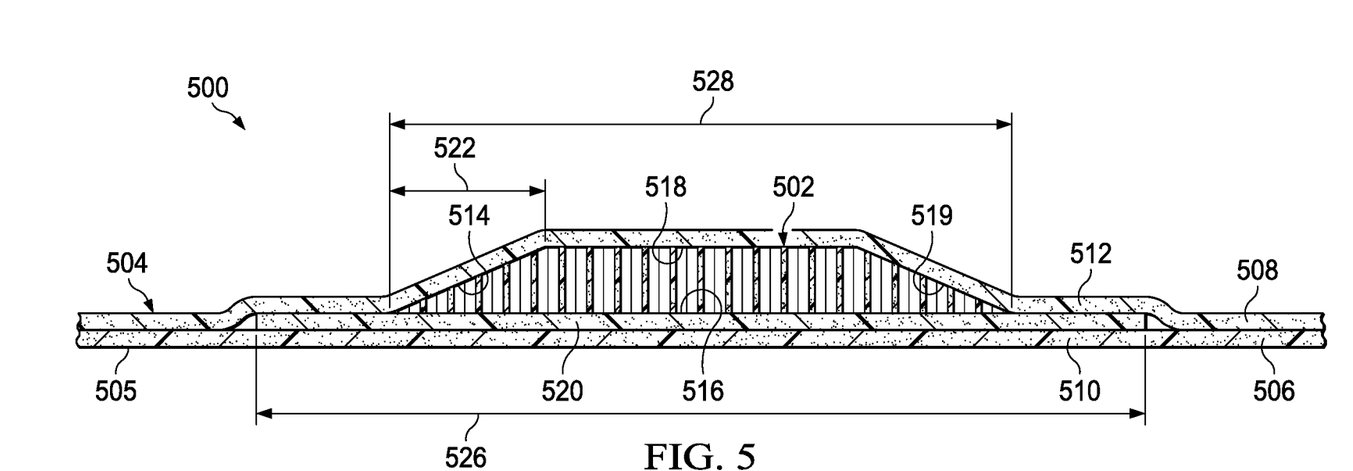
FIG. 5 is an illustration of a cross-sectional view of a cellular core ring in a composite duct in accordance with an illustrative embodiment.

Turning now to FIG. 5, an illustration of a cross-sectional view of a cellular core ring in a composite duct is depicted in accordance with an illustrative embodiment. View 500 is a cross-sectional view of cellular core ring 502 through composite duct 504. Cellular core ring 502 is a physical implementation of cellular core ring 138 of FIG. 1. In some illustrative examples, cellular core ring 502 is the same as cellular core ring 300 of FIG. 3.

As depicted, wall 505 of composite duct 504 is formed from first ply 506 and second ply 508. In some illustrative examples, first ply 506 is referred to as inner ply 510. In some illustrative examples, second ply 508 is referred to as outer ply 512.

Inner ply 510 contacts outer ply 512 to form airtight wall 505 of composite duct 504. Cellular core ring 502 provides reinforcement to composite duct 504. As depicted, cellular core ring 502 has trapezoidal cross-section 514.

Cellular core ring 502 has first face 516 and second face 518. First face 516 contacts partial ply 520. Second face 518 has bevels 519 and contacts outer ply 512. Partial ply 520 extends past first face 516 of cellular core ring 502 to contact both inner ply 510 and outer ply 512. Partial ply 520 prevents air pathways between inner ply 510 and outer ply 512 to prevent leaks.

Bevels 519 aid in manufacturing composite duct 504. Bevels 519 aid in laying outer ply 512 over cellular core ring 502 without undesirable amounts of gaps. As depicted, each of bevels 519 has length 524. Length 524 has any desirable quantity.

In some illustrative examples, length 524 is in the range of ¼ inch to 1 inch. In some illustrative examples, length 524 is about ½ inch. In some illustrative examples, length 524 is selected to provide a bevel angle in the range of 15 degrees to 45 degrees.

Partial ply 520 is formed of any desirable impermeable material. In some illustrative examples, partial ply 520 is formed of a composite material. In some illustrative examples, partial ply 520 is formed of any desirable thermoplastic material. Distance 526 measured from end to end of partial ply 520 has any desirable value to maintain an airtight seal for composite duct 504. In some illustrative examples, distance 526 is at least half an inch on either side of cellular core ring 502.

As depicted, cellular core ring 502 has width 528. Width 528 has any desirable value in the range of 1 inch to 3 inches. In some illustrative examples, cellular core ring 502 has width 528 of approximately 2 inches.

Figure 6:
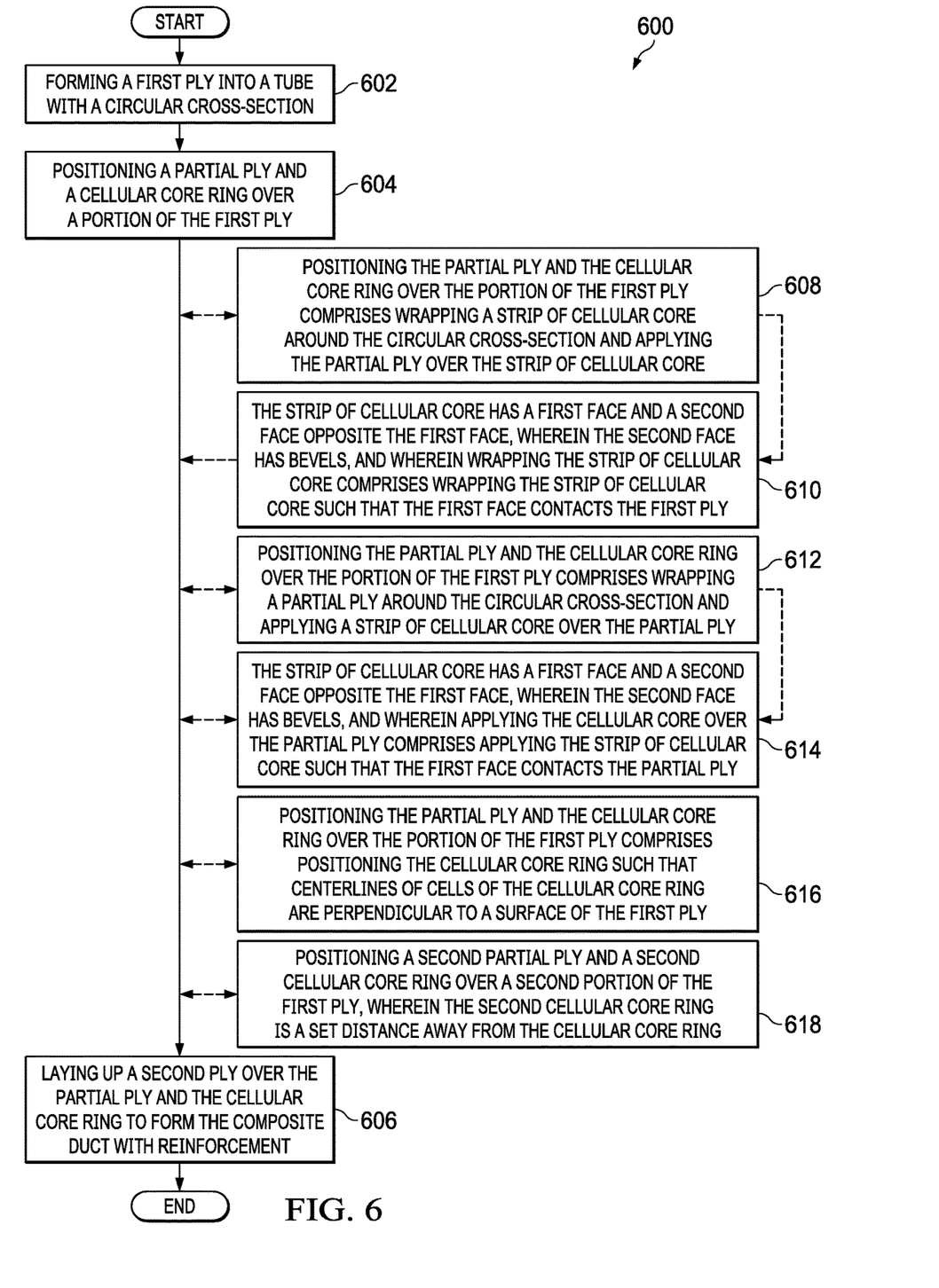
FIG. 6 is an illustration of a flowchart of a method for forming a composite duct with reinforcement in accordance with an illustrative embodiment.

Turning now to FIG. 6, an illustration of a flowchart of a method for forming a composite duct with reinforcement is depicted in accordance with an illustrative example. Method 600 may be used to form composite duct 102 with reinforcement 104 of FIG. 1. Method 600 may be used to form composite duct 200 with reinforcement 204 of FIGS. 2 and 3. Method 600 may be used to form composite duct 404 of FIG. 4. Method 600 may be used to form composite duct 504 of FIG. 5.

Method 600 forms a first ply into a tube with a circular cross-section (operation 602). Method 600 positions a partial ply and a cellular core ring over a portion of the first ply (operation 604). Method 600 lays up a second ply over the partial ply and the cellular core ring to form the composite duct with reinforcement (operation 606). Afterwards, method 600 terminates.

In some illustrative examples, positioning the partial ply and the cellular core ring over the portion of the first ply comprises wrapping a strip of cellular core around the circular cross-section and applying the partial ply over the strip of cellular core (operation 608). In some illustrative examples, the strip of cellular core has a first face and a second face opposite the first face, wherein the second face has bevels, and wherein wrapping the strip of cellular core comprises wrapping the strip of cellular core such that the first face contacts the first ply (operation 610).

In some illustrative examples, positioning the partial ply and the cellular core ring over the portion of the first ply comprises wrapping a partial ply around the circular cross-section and applying a strip of cellular core over the partial ply (operation 612). In some illustrative examples, the strip of cellular core has a first face and a second face opposite the first face, wherein the second face has bevels, and wherein applying the strip of cellular core over the partial ply comprises applying the strip of cellular core such that the first face contacts the partial ply (operation 614).

In some illustrative examples, positioning the partial ply and the cellular core ring over the portion of the first ply comprises positioning the cellular core ring such that centerlines of cells of the cellular core ring are perpendicular to a surface of the first ply (operation 616).

In some illustrative examples, method 600 comprises positioning a second partial ply and a second cellular core ring over a second portion of the first ply, wherein the second cellular core ring is a set distance away from the cellular core ring (operation 618).

Figure 7:
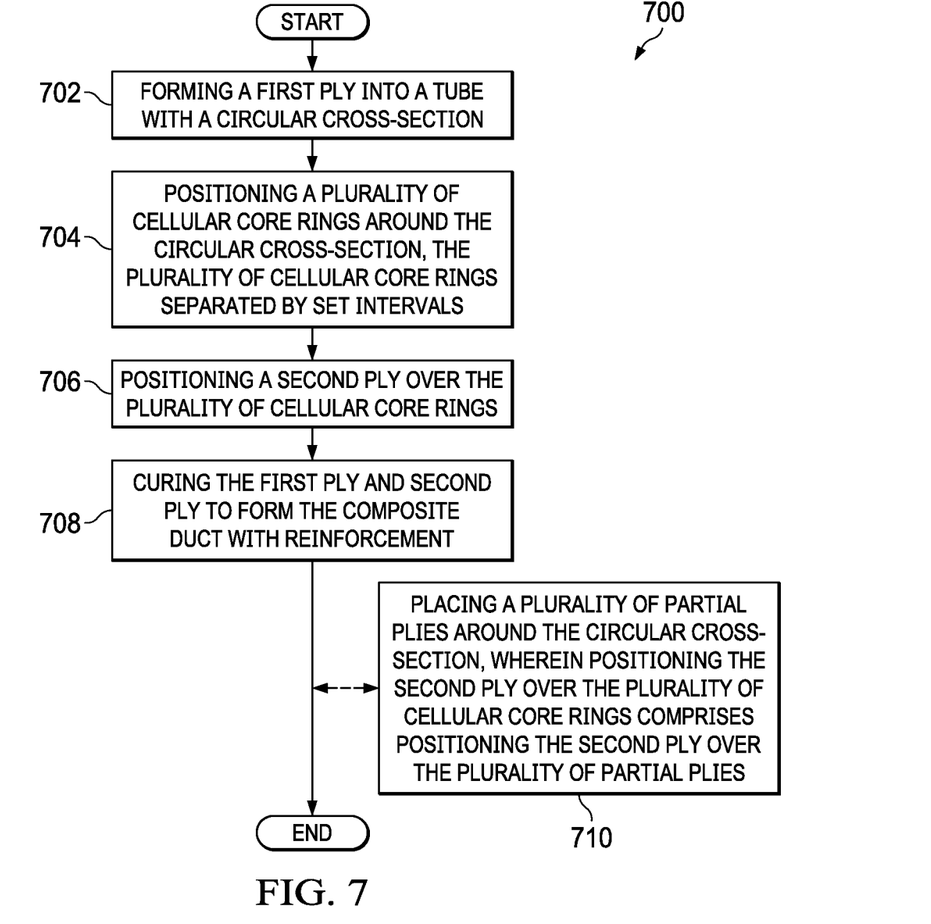
FIG. 7 is an illustration of a flowchart of a method for forming a composite duct with reinforcement in accordance with an illustrative embodiment.

Turning now to FIG. 7 is an illustration of a flowchart of a method for forming a composite duct with reinforcement is depicted in accordance with an illustrative example. Method 700 may be used to form composite duct 102 with reinforcement 104 of FIG. 1. Method 700 may be used to form composite duct 200 with reinforcement 204 of FIGS. 2 and 3. Method 700 may be used to form composite duct 404 of FIG. 4. Method 700 may be used to form composite duct 504 of FIG. 5.

Method 700 forms a first ply into a tube with a circular cross-section (operation 702). Method 700 positions a plurality of cellular core rings around the circular cross-section, the plurality of cellular core rings separated by set intervals (operation 704). In some illustrative examples, the set intervals are selected based on at least one of the diameter of the circular cross-section, an operating pressure for the resulting composite duct, and the material of composite duct.

Method 700 positions a second ply over the plurality of cellular core rings (operation 706). Method 700 cures the first ply and second ply to form the composite duct with reinforcement (operation 708). Afterwards, method 700 terminates.

In some illustrative examples, the plurality of cellular core rings each is formed of a honeycomb material having a thickness in the range of 1/16 inch to ½ inch. In some illustrative examples, the plurality of cellular core rings each is formed of a respective cellular core strip having bevels. In some illustrative examples, the bevels each have a length in the range of ¼ inch to 1 inch. In some illustrative examples, the bevels each have a length of about ½ inch. In some illustrative examples, each of the bevels of a length selected to provide a bevel angle in the range of 15 degrees to 45 degrees.

In some illustrative examples, method 700 places a plurality of partial plies around the circular cross-section, wherein positioning the second ply over the plurality of cellular core rings comprises positioning the second ply over the plurality of partial plies (operation 710). The partial plies maintain the airtight seal of the composite duct. The partial plies contact both the first ply and the second ply to reduce or prevent air pathways through first ply and second ply into the composite duct.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 600 or method 700 are performed. For example, operations 608 through 618 of FIG. 6 may be optional. As another example, operation 710 of FIG. 7 may be optional.

Figure 8:
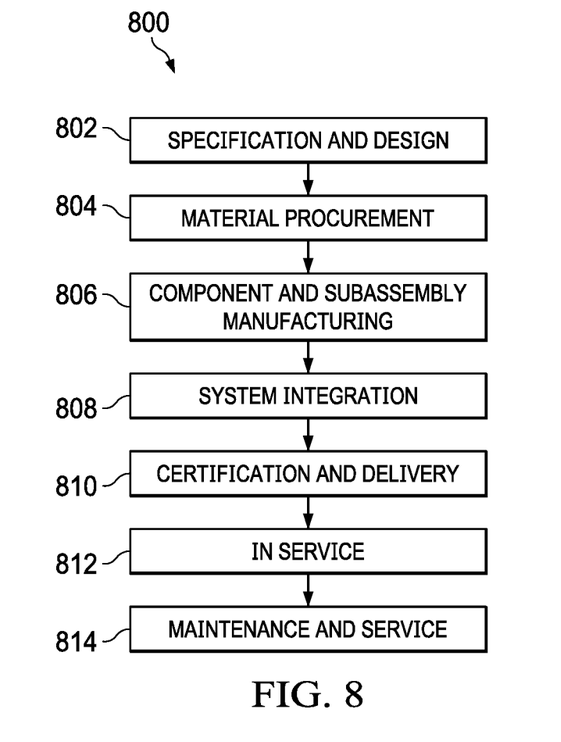
FIG. 8 is an illustration of an aircraft manufacturing and service method in the form of a block diagram in accordance with an illustrative embodiment.
Figure 9:
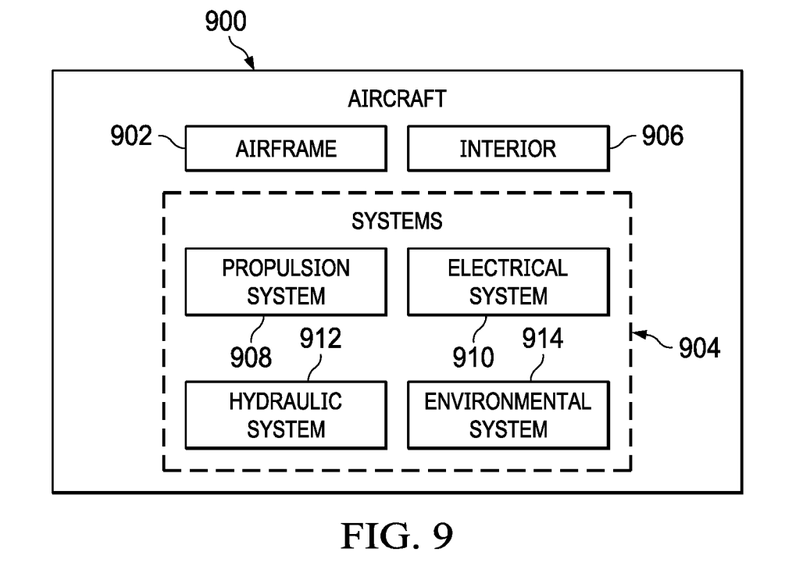
FIG. 9 is an illustration of an aircraft in the form of a block diagram in which an illustrative example may be implemented.

The illustrative examples of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative example. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 9, an illustration of an aircraft is depicted in which an illustrative example may be implemented. In this example, aircraft 900 is produced by aircraft manufacturing and service method 800 in FIG. 8 and may include airframe 902 with a plurality of systems 904 and interior 906. Examples of systems 904 include one or more of propulsion system 908, electrical system 910, hydraulic system 912, and environmental system 914. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 800. One or more illustrative examples may be used during component and subassembly manufacturing 806, system integration 808, or maintenance and service 814 of FIG. 8. For example, composite duct 102 of FIG. 1 may be a component of aircraft 900, formed during component and subassembly manufacturing 806. As another example, composite duct 102 may be a component of aircraft 900 inspected or replaced during maintenance and service 814 of FIG. 8.

Apparatuses and methods embodied herein may be employed in manufacturing at least one component of aircraft 900. For example, composite duct 102 may be a component extending through at least one of airframe 902 or interior 906.

The illustrative examples provide a composite duct with reinforcement. The reinforcement is provided by cellular core rings. The cellular core rings are formed of any desirable cellular core material such as honeycomb core. Honeycomb core ribs on negative pressure composite ducts prevent duct collapse. The cellular core rings add strength to the composite duct by adding height to the composite buildup forming the composite duct without the extra weight of solid composite material.

The illustrative examples provide a composite duct having an increased strength. The illustrative examples provide a cost savings over increasing the strength of a composite duct with additional composite plies. The illustrative examples also provide a weight savings over increasing the strength of a composite duct with additional composite plies.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite duct with reinforcement comprising:
   forming a first ply into a tube with a circular cross-section;
   positioning a partial ply and a cellular core ring over a portion of the first ply, wherein the cellular core ring is formed of a cellular core strip having bevels; and
   laying up a second ply over the partial ply and the cellular core ring to form the composite duct with reinforcement.

2. The method of claim 1, wherein positioning the partial ply and the cellular core ring over the portion of the first ply comprises wrapping the strip of cellular core around the circular cross-section and applying the partial ply over the strip of cellular core.

3. The method of claim 2, wherein the strip of cellular core has a first face and a second face opposite the first face, wherein the second face has the bevels, and wherein wrapping the strip of cellular core comprises wrapping the strip of cellular core such that the first face contacts the first ply.

4. The method of claim 3, wherein each of the bevels has a length of ¼ inch to 1 inch.

5. The method of claim 1, wherein positioning the partial ply and the cellular core ring over the portion of the first ply comprises wrapping the partial ply around the circular cross-section and applying the strip of cellular core over the partial ply.

6. The method of claim 5, wherein the strip of cellular core has a first face and a second face opposite the first face, wherein the second face has the bevels, and wherein applying the strip of cellular core over the partial ply comprises applying the strip of cellular core such that the first face contacts the partial ply.

7. The method of claim 1 further comprising:
positioning a second partial ply and a second cellular core ring over a second portion of the first ply, wherein the second cellular core ring is a set distance away from the cellular core ring.

8. The method of claim 7, wherein the set distance is in the range of 10 inches to 25 inches.

9. The method of claim 1, wherein positioning the partial ply and the cellular core ring over the portion of the first ply comprises positioning the cellular core ring such that centerlines of cells of the cellular core ring are perpendicular to a surface of the first ply.

10. The method of claim 1, wherein the cellular core ring has a trapezoidal cross-section.

11. The method of claim 1, wherein the cellular core ring is formed of a honeycomb material having a thickness in the range of ¹⁄₁₆ inch to ½ inch.

12. The method of claim 1, wherein the cellular core ring is formed of a honeycomb material having a width in the range of 1 inch to 3 inches.

13. A method of forming a composite duct with reinforcement comprising:
forming a first ply into a tube with a circular cross-section;
positioning a plurality of cellular core rings around the circular cross-section, the plurality of cellular core rings separated by set intervals;
positioning a second ply over the plurality of cellular core rings; and
curing the first ply and second ply to form the composite duct with reinforcement;
wherein the plurality of cellular core rings each is formed of a respective cellular core strip having bevels.

14. The method of claim 13, wherein the plurality of cellular core rings each is formed of a honeycomb material having a thickness in the range of ¹⁄₁₆ inch to ½ inch.

15. The method of claim 13, wherein the bevels each have a length in the range of ¼ inch to 1 inch.

16. The method of claim 13 further comprising:
placing a plurality of partial plies around the circular cross-section, wherein positioning the second ply over the plurality of cellular core rings comprises positioning the second ply over the plurality of partial plies.

17. A method of forming a composite duct with reinforcement comprising:
forming a first ply into a tube with a circular cross-section;
positioning a partial ply and a cellular core ring over a portion of the first ply, wherein the cellular core ring has a trapezoidal cross-section; and
laying up a second ply over the partial ply and the cellular core ring to form the composite duct with reinforcement.

18. The method of claim 17, wherein positioning the partial ply and the cellular core ring over the portion of the first ply comprises wrapping a strip of cellular core around the circular cross-section and applying the partial ply over the strip of cellular core.

19. The method of claim 17, wherein positioning the partial ply and the cellular core ring over the portion of the first ply comprises wrapping a partial ply around the circular cross-section and applying a strip of cellular core over the partial ply.

20. The method of claim 17 further comprising:
positioning a second partial ply and a second cellular core ring over a second portion of the first ply, wherein the second cellular core ring is a set distance away from the cellular core ring.

* * * * *